Feb. 11, 1936.  L. B. McWILLIAMS ET AL  2,030,310
APPARATUS FOR DESTROYING INSECTS
Filed Nov. 21, 1933   2 Sheets-Sheet 1
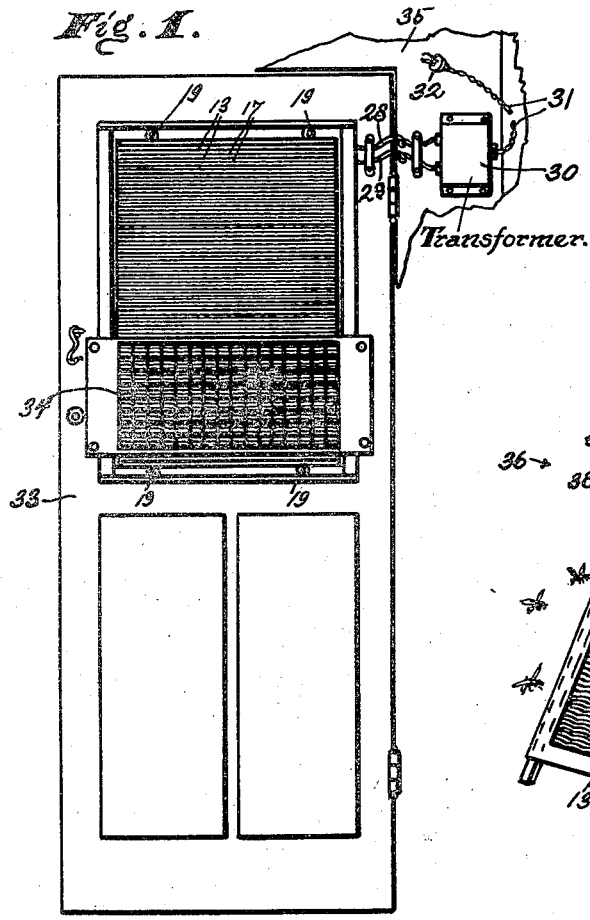
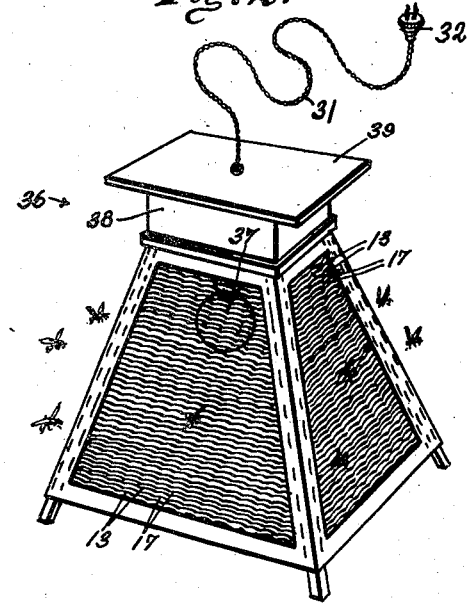
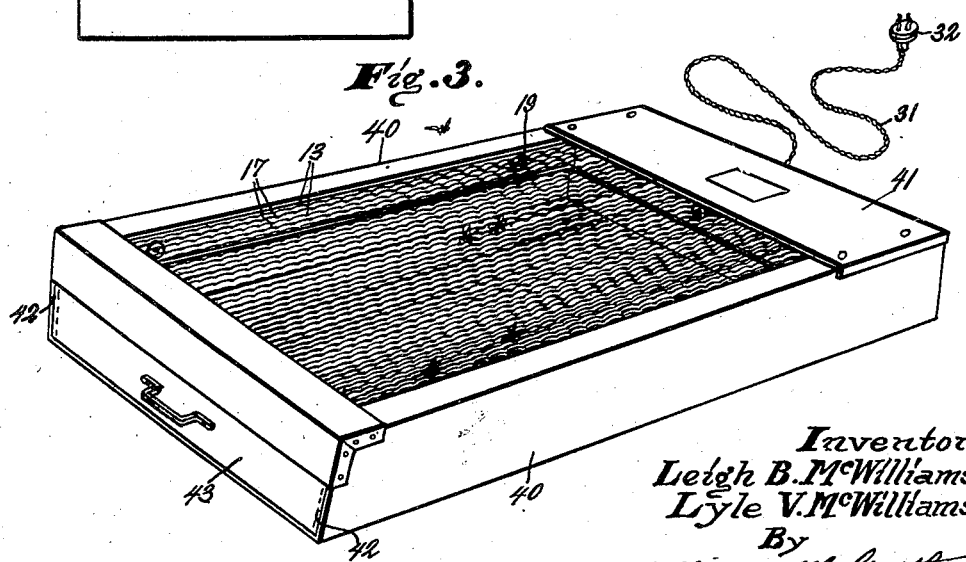
Inventors.
Leigh B. McWilliams.
Lyle V. McWilliams.
By
William M. Gentle
Their Attorney.

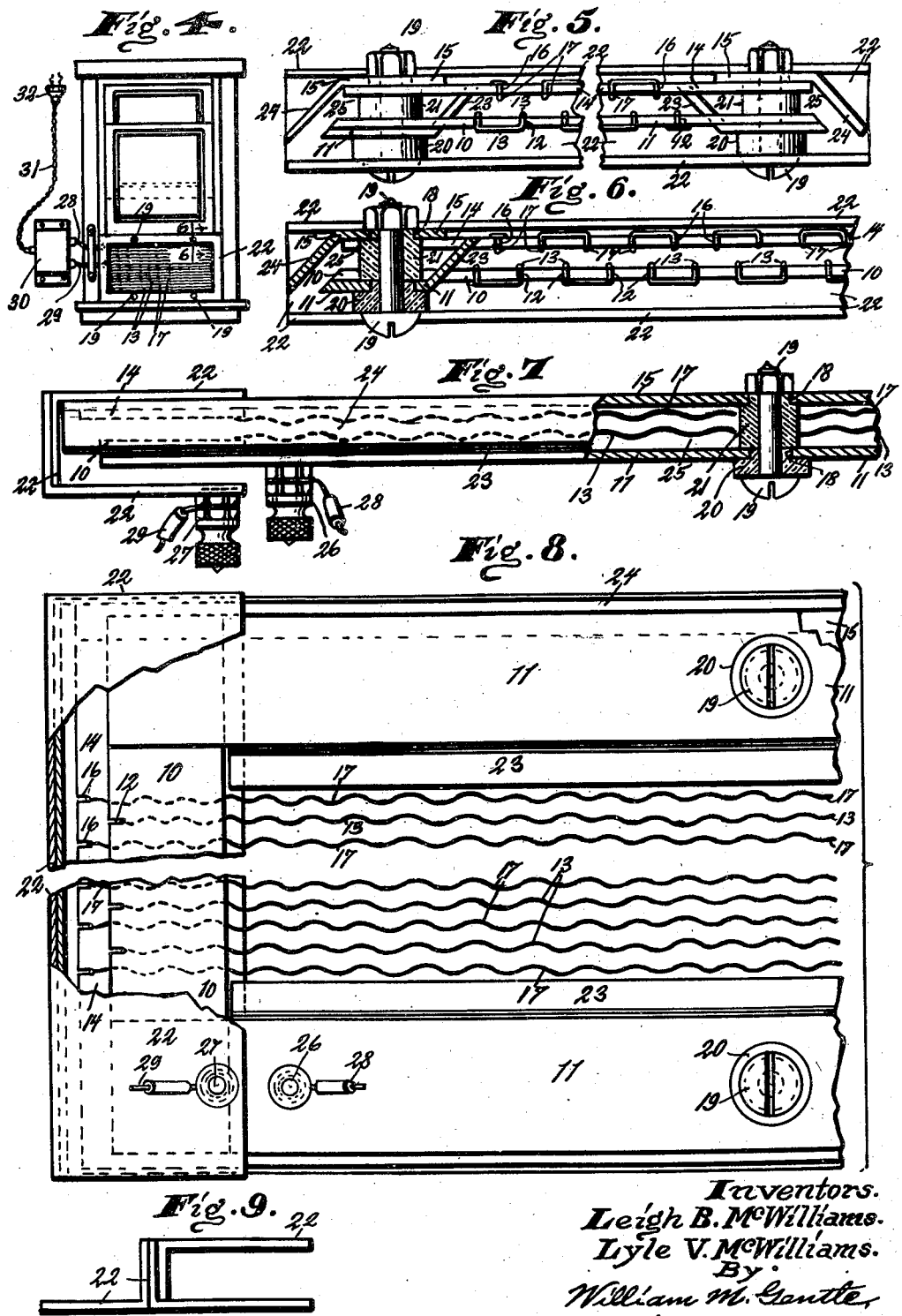

Patented Feb. 11, 1936

2,030,310

UNITED STATES PATENT OFFICE

2,030,310

APPARATUS FOR DESTROYING INSECTS

Leigh B. McWilliams and Lyle V. McWilliams, Whittier, Calif.

Application November 21, 1933, Serial No. 699,000

2 Claims. (Cl. 43—112)

This invention relates to improvements that we have made on our Insect destroyer, patented May 23, 1933, No. 1,910,623; and one of the principal objects is to make an apparatus that is relatively safe from hand contact by arranging an electrically charged frame and its winding back of a corresponding negative frame and winding so that the latter, in addition to receiving and grounding the electrical current from the former, also serves as a guard over or in front of the electrically charged frame.

In the patent above mentioned we used a single frame made of insulating material on which we wound both the positive and negative wires so their strands extended across both the front and back of the frame and parallel with one another.

Also they were arranged so the positive and negative wire strands alternated in position so that both in front and back of the frame the live wires were exposed so it was quite easy for a person's hands to come into contact with them, and while not dangerous, this was an objectionable feature, especially in places habited by children.

This objectionable feature we have eliminated in our present construction as the positive electrical charged frame and the live wires are arranged back of a negative frame and winding so they are well guarded against the hand contact of individuals.

A feature of invention is shown in providing a positive frame arranged to receive electricity directly from a source of supply, and through it the positive wire winding is supplied with the electrical current so that each strand thereof is directly charged with electricity. In our previous construction the electrical current passed through a coil from one end thereof to the other; but in this apparatus the electricity passes from the frame into the individual wire strands; so that if desired the wiring need not be in the form of a coil but can be short lengths of wire if desired.

A feature of invention is shown in uniting the positive and negative frames, their wire windings and side guards into a unit that can be used alone to guard openings through doors and windows; and also so it can be placed as a unit in other contrivances suitable for use in restaurants, markets, dairies, gardens, orchards and like places. In other words, the above mentioned parts are assembled and secured in a compact unit, one or more of which can be placed in a housing having a plurality of openings therein.

Another feature of invention is shown in connecting the end plates of the positive and negative frames so they are insulated from one another and are also spaced a proper distance apart; which spacing distance can be increased or decreased as may be desired by correspondingly increasing or decreasing the length of the spacing blocks between them.

Another feature of invention is shown in providing the side plates of the frames with spaced notches that aid in securing the wire windings to the frames so these strands are parallel and spaced a proper distance apart. Also the notches of one frame are offset relative to the notches of the other so the positive and negative wire strands appear in alternate positions with the positive wires arranged a short distance back of the negative wires. Also the wire windings are arranged on the frames so that the positive strands of wire extend over the front of the positive frame, and the negative strands of wire extend over the back of the negative frame, which arrangement brings the wire strands of each frame close together.

In other words, the strands of the positive and negative wire windings are closer to one another than their respective frames.

A feature of invention is shown in spacing the positive and negative all metal frames apart so that dust accumulating on them cannot easily cause a short circuit, and also this arrangement of parts prevents moisture such as rain or dew from also short-circuiting the current.

As is well known, screens constructed with porcelain insulators or the like, after becoming cooled with dust or the like, gather moisture from the atmosphere and damp plates where steam and water are used for sterilization, which results in decreasing the killing power of the screen and makes it ineffective to perform its function until dried. This condition is eliminated in our all-metal moisture-proof screen by the construction and arrangement of parts as hereafter described. Another feature of invention is shown in grounding the current in one of the frames to thereby eliminate the fire hazard.

Other objects, advantages and features of invention may appear from the accompanying drawings, the subjoined detailed description and the appended claims.

The accompanying drawings illustrate the invention; and in many of the figures, the parts of the apparatus are shown diagrammatically.

Figure 1 is a front elevation of a door showing our insect destroyer connected thereto; and also showing a wire screen arranged over its lower end portion to guard the electrically charged frame and wiring against contact with a person's hand.

Figure 2 is another perspective view, showing an orchard or garden stand provided with our insect destroyer.

Figure 3 is another perspective view showing an insect destroyer that is especially constructed for use in restaurants, public markets, dairies, gardens or the like places.

Figure 4 is a front elevation view of a window with our insect destroyer attached thereto.

Figure 5 is a fragmental side view of our apparatus showing the means for securing the positive and negative frames together, and also showing how the notches of one frame are offset relative to the other.

Figure 6 is a greatly enlarged section on line 6—6, Figure 4 showing the detailed construction of the insulated connection between the frames.

Figure 7 is a fragmental view of the apparatus with a portion broken away to show the end plate connections; and also the positions of the rear positive wire strands relative to the front negative wire strands.

Figure 8 is a fragmental back view of the apparatus showing the side positions of the positive and negative frames and their respective wire windings relative to one another.

Figure 9 is an end view of one of the sideguards.

Our apparatus for destroying insects includes a positive sheet metal frame that is formed with side plates 10 and end plates 11 that can have their crossed ends secured together in any well known way either by rivets or welding but preferably the latter.

The side plates 10 have spaced notches 12 in their outer edges that aid in securing a positive wire winding over the frame so its strands 13 are properly spaced apart and are extended from side to side thereof and parallel so they cover the front side of the rectangular frame, and each strand of the wiring is charged with electricity directly from the charged frame.

Also arranged in front of the positive frame is a negative sheet metal frame that is a component part of the apparatus and that is constructed with the side plates 14 and end plates 15. These have their crossed ends secured together as are the ends of the positive frame; and preferably this negative frame is slightly wider than the positive frame but preferably they are the same length.

The side plates 14 have spaced notches 16 in their outer edges that aid in securing a negative wire winding on the frame so its strands 17 are properly spaced apart and extended from side to side thereof and parallel so they cover the rear side of the rectangular negative metal frame and each strand of the winding is arranged to ground the electrical current in the negative frame independently of the other strands when an insect engages adjacent positive and negative wires.

The notches 12 and wire strands 13 are offset relative to the notches 16 and wire strands 17 so the positive and negative wires alternate in position, and also so that from a front view of the apparatus the positive wire strands appear to be located exactly centrally between adjacent negative wire strands. The positive wire strands are arranged a predetermined distance in the rear of the negative wire strands so they are guarded from the front by the negative wire strands. By this arrangement the positive frame and the live wires thereon are arranged so a person's hand cannot easily come into contact with them.

The positive and negative frames are secured together but insulated from one another by the insulation blocks 20 and 21 as best shown in Figures 5 to 8, inclusive, and are spaced apart so that accumulating dust and moisture cannot short-circuit their windings.

The end frames 11 and 15 both at the top and bottom of the apparatus having registering holes 18 for the screw bolts 19. These screw bolts 19 are also extended through the insulation blocks 20 and 21 and secured to hold the frames together in a rigid rectangular unit with the frames spaced a proper distance apart by the blocks 20 and 21 so that insects in attempting to pass through the frames are quite certain to simultaneously touch both a negative and positive wire strand to thereby complete the electrical circuit between the frames so the current will pass as best shown in Figure 7.

Preferably the sides of the positive and negative frame are enclosed by channeled housings 22 that are secured to the end plates 15 so they are held out of contact with the positive frame as best shown in Figure 7.

As shown in Figures 5 and 6 the end plates 11 have outwardly inclined flanges 23 and also the end plates 15 have inwardly inclined flanges 24 that together form enclosures 25 around the insulation spacing blocks 21, and in addition to enclosing the blocks, these flanges enhance the appearance of the insect destroying apparatus.

As best shown in Figures 7 and 8 the positive frame 10 is provided with a contact 26 that can be placed in circuit with a source of electricity by means of wire 28.

Also a grounding contact 27 is secured to one of the side housings 22; and as usual the contacts 26 and 27 are connected by wires 28 and 29 to a transformer 30 that can be placed as usual in circuit with a source of electricity by cord 31 and plug 32.

The apparatus thus described is a unit that can be made in sizes suitable for closing openings of various sizes and shapes through any size door, window or insect destroying apparatus. That is, it can be made as large or as small as the occasion may require. In Figure 1 it is shown attached to a door and made much longer than it is wide, while, on the contrary, it is shown in Figure 4 as attached to a window and made much wider than it is long.

In Figure 1 the apparatus is shown completely filling the top panel opening of the door 33; and over the lower portion of the positive frame and wire strands we arrange a wire guard 34. This guard is not necessary except on the rear side of the door where the charged wires are exposed; as the negative wires on the opposite side form a hand guard as stated.

The transformer 30 can be secured to the door casing 35 as fragmentally shown in the above mentioned figure.

In Figure 2 we show four of the units arranged in a stand 36. This is adapted for use in gardens, orchards and the like; and these units form an enclosure around the electric lamp 37 that is arranged suspended from the bottom of the transformer box 38 below the stand top 39 to attract insects toward the apparatus at night. The detailed construction of the transformer and its connection to the lamp 37 and positive frames of the stand 36 are not shown as they are well understood. The transformer is provided with a cord 31 and plug 32 of usual construction, by which it can be placed in circuit with a source of electricity.

In Figure 3 we show our apparatus arranged in an opening in the top end of a box drawer 40 that is especially adapted for use in restaurants, public markets, dairies and like places where there are usually a large number of flies and other insects.

In one of this box is a housing 41 for the usual transformer; and in the other end is an opening 42 for the sliding trough 43 that is removable to dispose of the dead insects that have fallen into the trough.

In these devices we prefer to use undulator wire windings like those shown in the drawing of our prior patent hereinbefore mentioned, but it is understood that we may use straight wire strands if we prefer to do so.

Referring back to Figures 5 and 6, it will be seen therein that the positive and negative frames are spaced apart as well as their wire windings; so it is necessary for the gap between them to be closed by an insect in order that the electrical current can pass from the charged positive frame into the negative frame; and when the gap is closed by an insect touching both a positive and negative wire of the windings or touching both the positive and negative frames at any point thereon, then the electric current will electrocute the insect and by means of this construction roaches and like insects cannot pass between either the frames or their windings.

The insect destroyer is placed in use as herein fully described.

What we claim as our invention is:—

1. An apparatus for destroying insects including a positive sheet metal frame including end and side plates and adapted to be placed in direct circuit with a source of electricity, said frame having flanges on the end plates thereof and spaced notches in its side plates, a positive wire winding secured in the spaced notches so the strands thereof extend parallel and from side to side of said frame and arranged to be charged with electricity through said positive frame, a negative metal frame secured to but insulated from and normally out of circuit with said positive frame and having flanges on the side plates thereof and also having spaced notches in the side plates thereof that are offset relative to the notches in the side plates of said positive frame, a negative wire winding secured in the offset spaced notches of said negative frame so the strands thereof extend parallel and from side to side thereof and also parallel and offset relative to the strands of said positive wire winding so that insects in attempting to pass between the strands of said windings will close the circuit between said frames and thereby be electrocuted by the electrical current.

2. The combination set forth in claim 1 with, said connections between said positive and negative frames including end and side plates and including insulation spacing blocks that are secured by screw bolts between the end plates of said frames for securely holding said positive frame out of circuit and contact with and spaced a proper distance from said negative frame, so that accumulated dust or moisture cannot short-circuit their windings.

LEIGH B. McWILLIAMS.
LYLE V. McWILLIAMS.